(12) United States Patent
Caruel et al.

(10) Patent No.: US 12,525,138 B2
(45) Date of Patent: Jan. 13, 2026

(54) SIMULATOR AND SIMULATION METHOD WITH INCREASED PRECISION, IN PARTICULAR A WEAPON SYSTEM SIMULATOR, AND WEAPON SYSTEM PROVIDED WITH SUCH A SIMULATOR

(71) Applicant: MBDA FRANCE, Le Plessis-Robinson (FR)

(72) Inventors: Nicolas Caruel, Le Plessis-Robinson (FR); Marc Durupt, Le Plessis-Robinson (FR)

(73) Assignee: MBDA FRANCE, Le Plessis-Robinson (FR)

( * ) Notice: Subject to any disclaimer, the term of this patent is extended or adjusted under 35 U.S.C. 154(b) by 412 days.

(21) Appl. No.: 18/271,809

(22) PCT Filed: Nov. 24, 2021

(86) PCT No.: PCT/FR2021/052089
§ 371 (c)(1),
(2) Date: Jul. 11, 2023

(87) PCT Pub. No.: WO2022/152979
PCT Pub. Date: Jul. 21, 2022

(65) Prior Publication Data
US 2024/0054910 A1     Feb. 15, 2024

(30) Foreign Application Priority Data

Jan. 13, 2021  (FR) ........................................ 2100228

(51) Int. Cl.
*G09B 9/00*    (2006.01)
*F41G 3/26*    (2006.01)

(52) U.S. Cl.
CPC ........... *G09B 9/003* (2013.01); *F41G 3/2655* (2013.01); *F41G 3/2688* (2013.01); *G09B 9/006* (2013.01)

(58) Field of Classification Search
CPC .......... G09B 9/00; G09B 9/003; G09B 9/006; F41G 3/2655; F41G 3/2688; F41A 33/00; F41A 33/02; F41A 33/04; F41A 33/06
See application file for complete search history.

(56) References Cited

U.S. PATENT DOCUMENTS 4,478,581 A * 10/1984 Goda ..................... F41G 3/265
434/22
6,283,756 B1   9/2001 Danckwerth et al.
(Continued)

FOREIGN PATENT DOCUMENTS

DE   10 2012 106 883 A1   1/2014
FR        2 968 113 A1   6/2012

OTHER PUBLICATIONS

International Search Report and Written Opinion for corresponding PCT Patent Application No. PCT/FR2021/052089, mailed Feb. 28, 2022, Machine Translation of Written Opinion (5 sheets).

*Primary Examiner* — Timothy A Musselman
(74) *Attorney, Agent, or Firm* — Womble Bond Dickinson (US) LLP

(57) ABSTRACT

Disclosed is a simulator and simulation method with increased precision, in particular a weapon system simulator, and weapon system provided with such a simulator. —The simulator (1) comprises a unit for generating a virtual image (I1) which is defined according to an orientation reference and a sighting reference, a unit for generating a so-called captured image from angle-error and telemetry measurements relating to one or more real actors (R1 to R4) each of which is equipped with a retroreflector (10), the angle-error and telemetry measurements being performed (Continued)

using a rangefinder, a comparison unit for comparing the current virtual image (I1) and the captured image so as to determine an error value representative of an orientation and/or sighting error, and a resetting unit for resetting the orientation reference and/or the sighting reference in order to correct said error value so as to create an optimised virtual image which is displayed on the vision element (2) in place of the current virtual image.

15 Claims, 5 Drawing Sheets

(56) References Cited

U.S. PATENT DOCUMENTS

| | | | |
|---|---|---|---|
| 9,791,243 B2 * | 10/2017 | Björkman | F41G 3/265 |
| 2004/0033472 A1 * | 2/2004 | Varshneya | F41G 3/2688 |
| | | | 434/23 |
| 2011/0311950 A1 * | 12/2011 | Preston | F41G 3/2655 |
| | | | 434/21 |

* cited by examiner

SIMULATOR AND SIMULATION METHOD WITH INCREASED PRECISION, IN PARTICULAR A WEAPON SYSTEM SIMULATOR, AND WEAPON SYSTEM PROVIDED WITH SUCH A SIMULATOR

CROSS-REFERENCE TO RELATED APPLICATIONS

This application is a U.S. National Phase Patent Application and claims priority to and the benefit of International Patent Application No. PCT/FR2021/052089, filed on Nov. 24, 2021, which claims priority to French Patent Application No. FR2100228, filed on Jan. 13, 2021. The entire contents of both of which are incorporated herein by reference.

TECHNICAL FIELD

The present invention relates to a simulator and a simulation method allowing for increase the precision of the simulation, and in particular to a combat shooting simulator that simulates real-world shooting by engaging the shooting in a virtual world. It also concerns a weapon system and a simulation system provided with at least one such simulator.

BACKGROUND

The present invention is therefore particularly, though not exclusively, applicable to the simulation of a weapon system.

In the field of the instrumented simulation, the shooting simulations are generally governed by a direct interaction between the shooter and the target to allow the target to be informed that it has been engaged by the shooter under conditions such that it is hit.

However, the technologies used often do not allow for the simulation of directed shooting at targets out of the direct view of the shooter or out of range of a laser interaction. To remedy this situation, simulators are used that link the shooter to the target via a central system.

Such a technique works well in a mode of use of the weapon, in which the shooter defines the conditions of the shooting at the latest at the moment of firing and does not intervene thereafter on the course of the ammunition. However, it cannot validly account for situations where the ammunition is guided and the shooter discovers his target as the ammunition flies over the obstacle, thanks to a real-time vision system embarked on the ammunition. In such a situation, he often also discovers other potential targets, stationary or movable, to which he may choose to direct the ammunition. In simulation, it is then important that these targets, invisible from the ground at the position of the shooter, are represented in his sight.

The patent FR 2 968 113 provides a method for simulating shooting beyond the direct view. In this case, when simulating an image-guided missile, the real view through the actual sight of the weapon system is replaced by a virtual reality image embedded in the sight. This virtual reality image is generated using a database of the terrain and of built elements, on which representative images of the actors are placed at their position in real time. These images are refreshed periodically to allow the evolution of the position of the actors due to their movements to be represented and to allow the evolution of the viewpoint from the advancing missile and of the position of its imaging sensor to be reflected. The position of the actors is provided by the central system using communication means.

However, there are some limitations in the implementation of this method. In particular, the imprecisions of the system due to imperfections in the orientation of the sighting and of the weapons, and in the measurement of the location of the actors, and to the approximation of database of the terrain and of built elements, as well as to the latency of the communications and to the discretization of the dating of the events, lead to relative deviations in the positioning of the actors and of the elements of the terrain (and of the built elements) in the virtual environment relative to the positioning of the actors in the real terrain. The discomfort is limited in the situations where the shooter cannot see the potential targets directly.

However, since the weapon system does not prohibit engaging targets in the direct view, situations arise where the shooter is able to compare the virtual view presented to him in the sight with the actual view of the terrain. The imperfections of the above-mentioned system can then lead to an incoherence in the representation of the tactical situation presented by each of the views, likely to disturb the actors and the training in which they are engaged, insofar as the conduct to be followed would be different according to the two interpretations of the situation.

This usual solution is therefore not completely satisfactory.

DESCRIPTION OF THE INVENTION

The present invention aims to overcome the above-mentioned disadvantages by providing a simulation method with increased precision.

A method for simulating at least one field of vision of a vision element (in particular a sight) of a simulator, said vision element displaying a virtual image of a virtual world representative of a real world located in its field of vision, the virtual image comprising one or more virtual actors representative of real actors located in the terrain, said method comprising a series of successive steps comprising a step of generating the virtual image, the virtual image being defined according to an orientation reference and a sighting reference and being generated from at least data of a terrain database, of the position of the simulator in the terrain and of the position of said real actors in the terrain, the virtual image displayed on the vision element being said current image.

According to the invention, said sequence of successive steps further comprises:

a step of generating an image referred to as captured image consisting in generating the captured image from measurements of angle-error and telemetry relating to one or more real actors, each of which is equipped with a retro-reflector, the measurements of angle-error and of telemetry being carried out by the simulator with the aid of a rangefinder generating telemetry emissions received and sent back by the retro-reflectors equipping the real actors;

a comparison step consisting in comparing the current virtual image and the captured image so as to determine at least one error value representative of an orientation and/or sighting error; and a resetting step consisting in resetting the orientation reference and/or the sighting reference of the virtual image to correct said error value so as to create an optimised virtual image, this optimised virtual image then being displayed on the vision element instead of the current virtual image.

Thus, thanks to the invention, the precision of the simulation is increased by displaying in the vision element (in particular a sight) a virtual image whose positioning has been optimised by being adapted to the actual position of one or more actors, a position which has been determined in the image captured from angle-error and telemetry measurements.

In the context of the present invention, a (real) actor can be a person or a vehicle. It can also be a building, an infrastructure element, or an element or landmark in the terrain. The (real) actor can be stationary or movable.

In a preferred embodiment, the step of generating the virtual image comprises at least the following sub-steps:
- a sub-step consisting in determining the position of the simulator in the terrain;
- a sub-step consisting in determining the position of the actors in the terrain; and
- a sub-step consisting in creating the virtual image by representing the location of the actors in a cone around the orientation reference with a summit placed on the sighting reference of the vision element.

Advantageously, the step of generating the virtual image further displays on the virtual image an imaged or infrared (virtual) representation of at least one part of the terrain located in the field of vision of the vision element from the terrain database.

Furthermore, advantageously, the step of generating the captured image comprises at least the following sub-steps:
- a sub-step consisting in carrying out, with the rangefinder, telemetry emissions in different directions in a cone around the orientation reference of the vision element and in carrying out a telemetry measurement in each of the directions where the telemetry emission is sent back to the rangefinder;
- a sub-step consisting in carrying out a measurement of the elevation and azimuth angles of the orientation of each of the directions which have been the subject of a telemetry measurement;
- a sub-step consisting in using the measurements of the elevation and azimuth angles about the orientation reference to create an image of said directions represented by points in a plane where the azimuth angle is on the abscissa and the elevation angle is on the ordinate; and
- a sub-step consisting in creating a 3D (three dimensions) image by associating to each of said points the corresponding distance obtained by the corresponding telemetry measurement, this 3D image representing the captured image.

Furthermore, advantageously, the comparison step carries out the comparison by determining the deviation between the position of at least one actor in the virtual image and the position (of the retro-reflector) of this same actor in the captured image, and the comparison step determines the error value using the following deviation or deviations:
- the deviation relating to a single actor; or
- the (possibly weighted) deviations relating to all the actors; or
- the (possibly weighted) deviations relating to some of the actors that have been selected according to at least one particular criterion, such as a distance criterion for example.

Advantageously, said sequence of successive steps can be implemented at least:
- periodically; or
- when a particular element is handled by an operator.

Furthermore, advantageously, the method comprises a further step consisting in transmitting the orientation reference and/or the sighting reference, obtained after the resetting, to at least one user device.

The present invention also relates to a simulator for simulating at least the field of vision of a vision element, said vision element of the simulator displaying a virtual image of a virtual world representative of a real world located in its field of vision, the virtual image comprising one or more virtual actors representative of real actors located in the terrain, said simulator also comprising a unit for generating the virtual image, the virtual image being defined according to an orientation reference and a sighting reference and being generated from at least data of a terrain database, of the position of the simulator in the terrain and of the position of said real actor or actors in the terrain, the virtual image displayed in the vision element being referred to as current image.

According to the invention, said simulator further comprises:
- a (laser) rangefinder configured to carry out angle-error and telemetry measurements;
- a unit for generating an image referred to as captured image, configured to generate the captured image on the basis of angle-error and telemetry measurements relating to one or more actors, each of which is equipped with a retro-reflector, the angle-error and telemetry measurements being carried out by the simulator with the aid of the rangefinder generating telemetry emissions which are received and sent back by the retro-reflectors equipped with the actors;
- a comparison unit configured to compare the current virtual image and the captured image so as to determine at least one error value representative of an orientation and/or sighting error; and
- a resetting unit configured to reset the orientation reference and/or the sighting reference of the virtual image to correct said error value so as to create an optimised virtual image, this optimised virtual image then being displayed on the vision element instead of the current virtual image.

In a particular embodiment, said simulator further comprises at least one of the following:
- a data emission and reception unit:
- the terrain database;
- a human-machine interface;
- at least one sensor for determining the position of the simulator;
- at least one sensor for determining the orientation reference and/or the sighting reference of the vision element.

Furthermore, in a first embodiment, the simulator corresponds to a combat shooting simulator simulating real-world shooting by engaging the shooting in a virtual world reconstructed from the position of the actors in the real world.

Furthermore, in a second embodiment, the simulator corresponds to an observation device simulator.

Furthermore, the present invention also relates to a weapon system comprising at least one simulator as described above.

Advantageously, the weapon system can be one of the following types:
- a weapon provided with a barrel, e.g. a missile launcher or a rocket launcher;
- a ballistic missile;
- a guided missile.

In a preferred embodiment, the weapon system comprises a laser device generating a shooting simulation and this laser device is used as a rangefinder by the simulator.

The present invention also relates to a simulation system. According to the invention, this simulation system comprises:
- at least one weapon system as described above, provided with at least one simulator;
- retro-reflectors equipping one or more actors;
- means for determining the position of the actor or actors;
- a central device configured to be able to communicate at least with the simulator of said weapon system.

In a preferred embodiment, at least several of said actors equipped with retro-reflectors are each equipped with a weapon system as described above, which is provided with at least one simulator. These actors are therefore both potential shooters and potential targets.

BRIEF DESCRIPTION OF FIGURES

Further advantages and characteristics will become apparent from the following description of several embodiments of the invention, given as non-limiting examples, with particular reference to the attached figures. In these figures, identical references designate similar elements.

DETAILED DESCRIPTION

Figure 1:
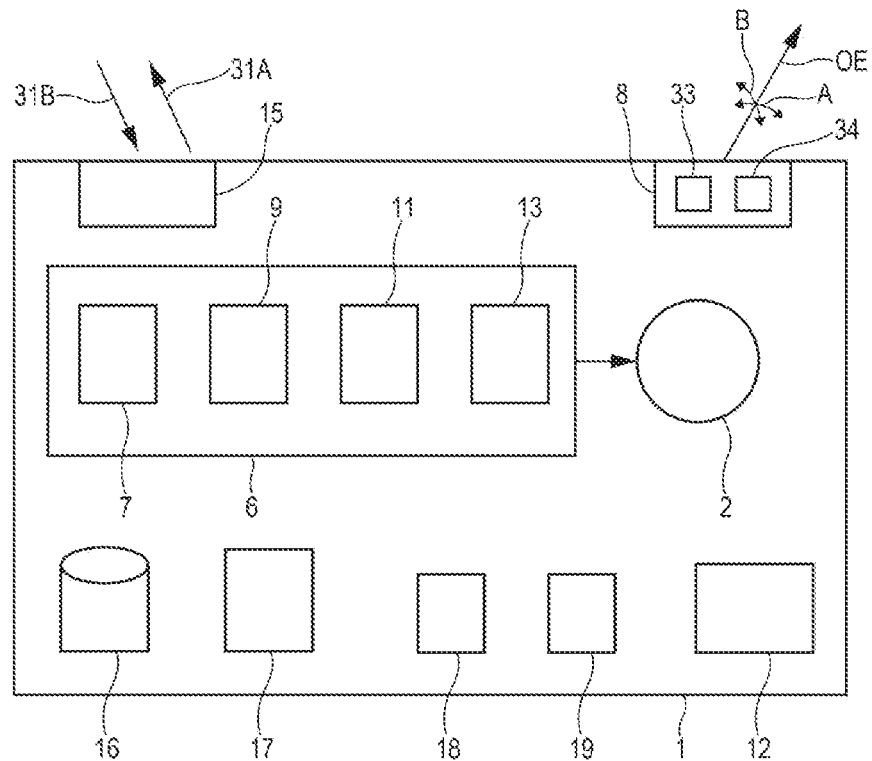
FIG. 1 is a block diagram of a particular embodiment of a simulator according to the invention.

The simulator 1 shown very schematically in FIG. 1 and allowing to illustrate the invention is a simulator of at least one field of vision of an (optical) vision element.

In the following description, the vision element is described as a sight 2, in particular a sight of a weapon system 4. However, in the context of the present invention, the vision element may also be another optical element with a field of vision, for example an optical element forming part of a visual guide system, in particular for guiding a missile.

Figure 2:
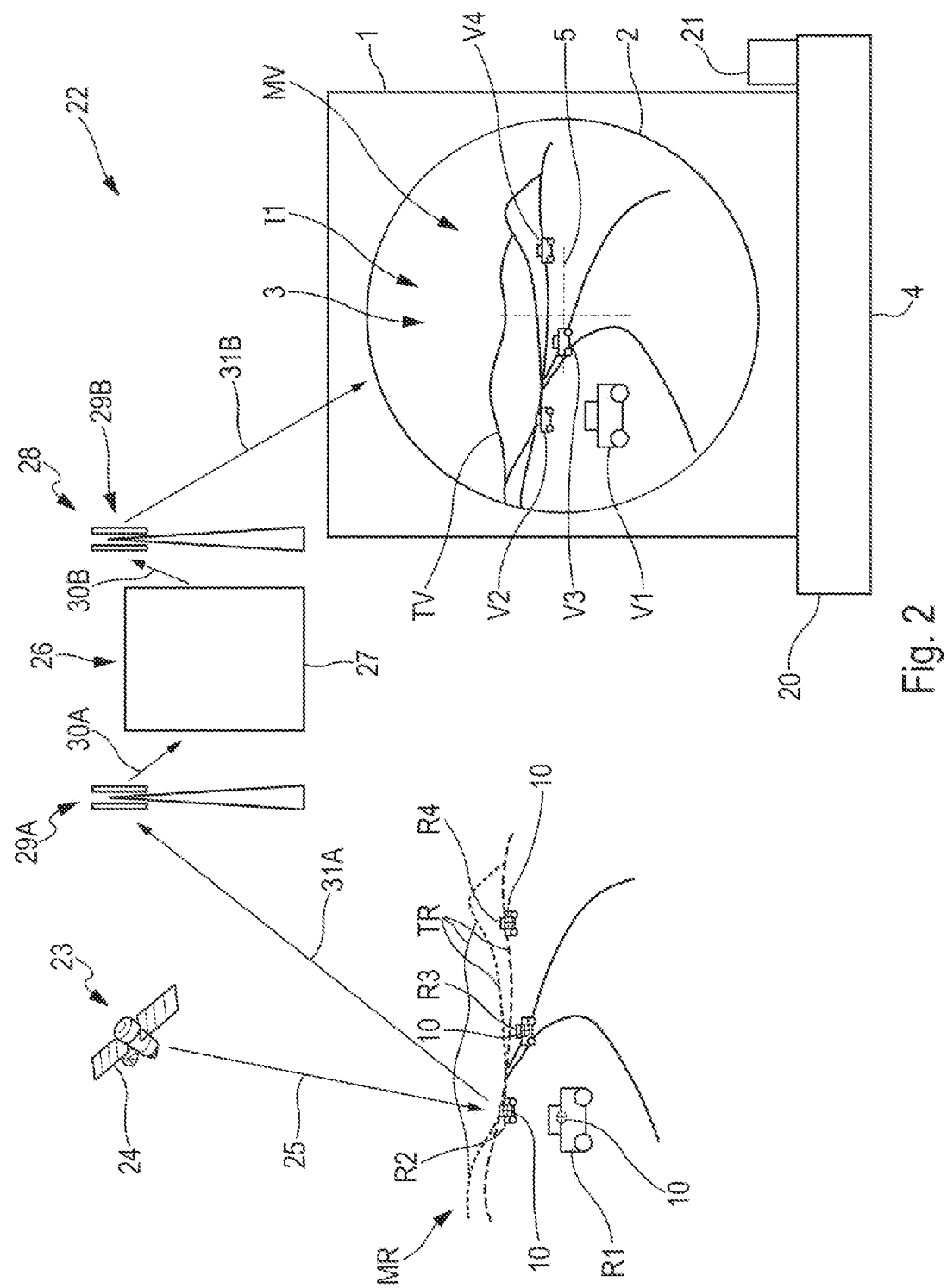
FIG. 2 is a block diagram of a particular embodiment of a simulation system according to the invention.

The sight 2 displays a virtual image I1 of a virtual world MV representative of the real world MR located in and around the field of vision 3 of the sight 2 (i.e. the part of the space considered by the sight 2), as shown in FIG. 2. The virtual image I1 comprises one or more virtual actors Vi representative of real actors Ri located in the terrain TR, namely the virtual actors V1, V2, V3 and V4 representative of the real actors R1, R2, R3 and R4 shown in FIG. 2. The sight 2 is also provided with a reticule 5 shaped like a crosshair.

The terrain TR of the real-world MR (shown on the left-hand side of FIG. 2) is represented in different plots (solid, dashed, etc.) in this FIG. 2 to highlight the depth. In a preferred embodiment, the virtual image I1 also comprises an imaged (or infrared) representation TV of at least one part of the terrain TR located in the field of vision of the sight 2.

In the context of the present invention, the real actors Ri can be people, for example enemy infantrymen, or vehicles, in particular enemy vehicles, such as for example tanks. They can also be buildings, infrastructure elements, or landmarks in the terrain. The real actors Ri can be stationary or movable.

The simulator 1 comprises, as shown in FIG. 1, a processing unit 6 provided with a generation unit 7 configured to generate the virtual image I1. The virtual image I1 is defined, in the usual way, according to an orientation reference and a sighting reference and is generated from at least data of a database of the terrain, of the position of the simulator 1 in the terrain TR and of the position of said real actors Ri in the terrain TR. The virtual image I1 that is displayed in the sight 2 at the present (or current) moment is referred to as current image.

The simulator 1 also comprises, as shown in FIG. 1, a laser rangefinder 8 configured to be able to carry out angle-error and telemetry measurements, as detailed below. In the following description, the rangefinder 8 can be referred to both for carrying out telemetry measurements and for carrying out angle-error measurements.

In order to increase the precision of the simulation, the processing unit 6 comprises, in addition to the generation unit 7:
- a generation unit 9 configured to generate an image referred to as captured image I2, from angle-error and telemetry measurements relating to one or more real actors Ri, each of whom is equipped with a retro-reflector 10. The retro-reflectors 10 may, for example, be conventional cube corner retro-reflectors. The angle-error and telemetry measurements are carried out by the simulator 1 using the rangefinder 8. To do this, the laser rangefinder 8 generates telemetry (laser) emissions which are received and sent back by the retro-reflectors 10 equipping the real actors Ri;
- a comparison unit 11 configured to compare the current virtual image I1 and the captured image I2 (generated by the generation unit 9). By this comparison, the comparison unit 11 determines, if necessary, an error value (or function) representative of an orientation and/or sighting error; and
- a resetting unit 13 configured to reset the orientation reference and/or the sighting reference of the virtual image in order to correct said error value (or function) so as to create an optimised virtual image I1opt. This optimised virtual image I1opt is then displayed on the sight 2 instead of the current virtual image, as shown in particular in FIGS. 4F, 5F and 6F.

Furthermore, said simulator 1 comprises, depending on the envisaged embodiment and as specified below, one or more of the following elements shown in FIG. 1:
- a data transmission unit 15, capable of receiving data and, according to the embodiment, also of emitting data:
- a database 16 comprising data of the terrain TR;
- a human-machine interface 17;
- at least one sensor 18 to determine the position of the simulator 1; and
- at least one sensor 19 to determine the orientation reference and/or the sighting reference of the sight 2.

Depending on the type of simulation it carries out, the simulator 1 also comprises an assembly 12 of usual elements and means not described further, which help in the implementation of the simulation.

In a preferred embodiment, specified below, the simulator 1 corresponds to a combat shooting simulator that simulates shooting in the real world by engaging the shooting in the virtual world reconstructed from the position of the actors in the real world.

In a preferred embodiment, the simulator 1 is part of a weapon system 4, shown schematically in FIG. 2. In addition to the simulator 1, the weapon system 4 also comprises an assembly 20 of standard means and equipment. These common means, which depend on the type of weapon system, are known and are not described further below.

For example, the weapon system 4 may be one of the following types:
  a weapon provided with a barrel, for example a rifle, a rocket launcher or a missile launcher;
  a ballistic missile;
  a guided missile.

In a preferred embodiment, the weapon system 4 comprises a conventional laser device 21 which generates a shooting simulation. In this preferred embodiment, this laser device 21 is used as a rangefinder 8 by the simulator 1. In this case, in one particular application, the laser functionalities commonly implemented to simulate ballistic shooting or the guided missile shooting in a direct view of the target are used to reset the origin and the orientation of the virtual view displayed in the sight so that the tactical situation in the virtual environment is representative of that observed in the real environment.

The simulator 1 thus provides a replica of the sighting of the weapon system 4 in the virtual world and determines in the virtual world the result of the shooting between the simulation weapon system and a real target (or real targets). The increased precision of the simulation, achieved through the above elements of the simulator 1, is implemented to simulate the engagement of the shooting and to simulate the shooting.

Furthermore, in a preferred application, the weapon system 4 is part of a simulation system 22 shown in FIG. 2.

In a preferred embodiment, this simulation system 22 comprises:
  one or more weapon systems 4 each provided with a simulator 1;
  a plurality of (real) actors Ri equipped with retro-reflectors 10. In a preferred embodiment, in the simulation system 22, several actors equipped with retro-reflectors comprise a weapon system provided with a simulator. These actors are, in this case, both potential shooters and potential targets;
  means 23 to determine the position of the actors Ri. By way of illustration, FIG. 2 shows a satellite 24 of a GPS-type (global positioning system) satellite positioning system, forming part of the means 23 and allowing to provide to the actors Ri their location, as illustrated by an arrow 25; and
  a central device 26 comprising a processing unit 27 and a communication system 28. In the example shown in FIG. 2, the communication system 28 comprises two radio systems 29A and 29B connected to the processing unit 27 as shown by links 30A and 30B. The radio systems 29A and 29B are represented by a mast and two antennas. It is also possible to provide a single radio system ensuring the assembly of the functions.

The communication system 28 allows the real actors Ri to provide the central device 26 with information containing their location, as illustrated by an arrow 31A. It also allows the central device 26 to provide the simulator or simulators 1 with information about the actors to be positioned in the virtual view of the weapon system 4, as illustrated by an arrow 31B.

The simulator 1, as described above, implements a simulation method (hereinafter "method P") to increase the precision of the simulation, in particular the simulation of at least the field of vision 3 of a vision element (sight 2).

Figure 3:
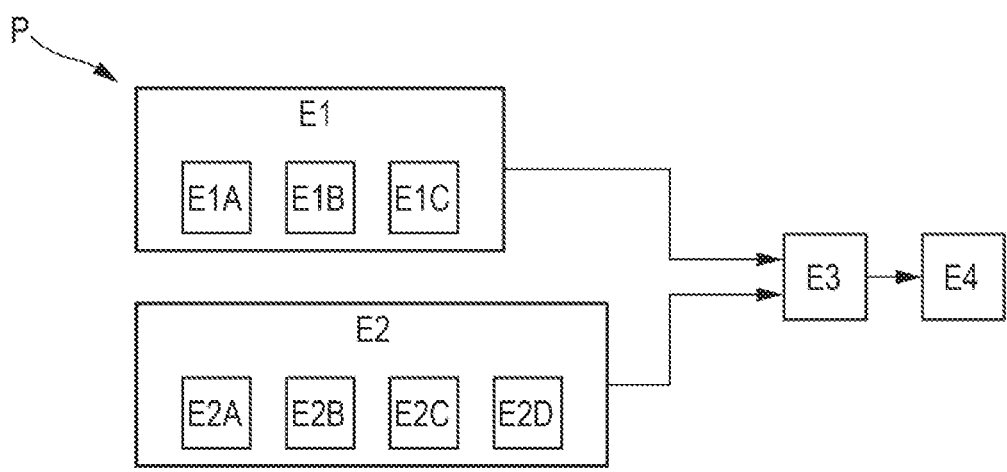
FIG. 3 shows schematically the main steps of a simulation method implemented using the simulator of FIG. 1.
Figure 5C:
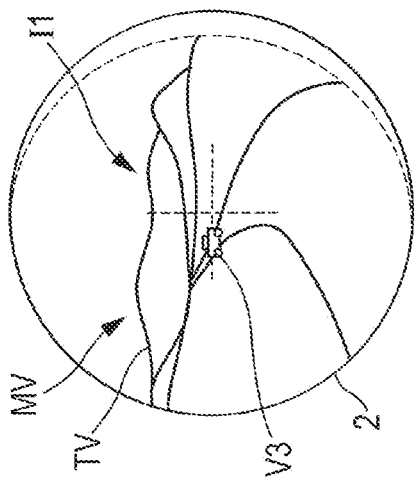
FIGS. 5A to 5F are similar to FIGS. 4A to 4F respectively, except that the real actor represents the target that is engaged in the simulated shooting.
Figure 5F:
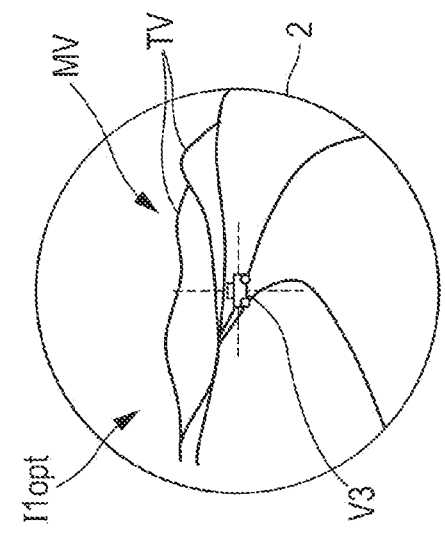
Figure 5B:
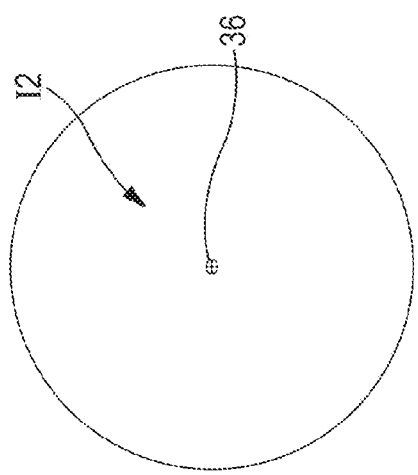
Figure 5E:
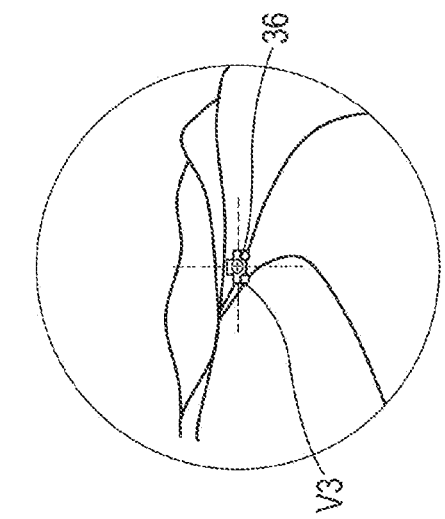
Figure 6C:
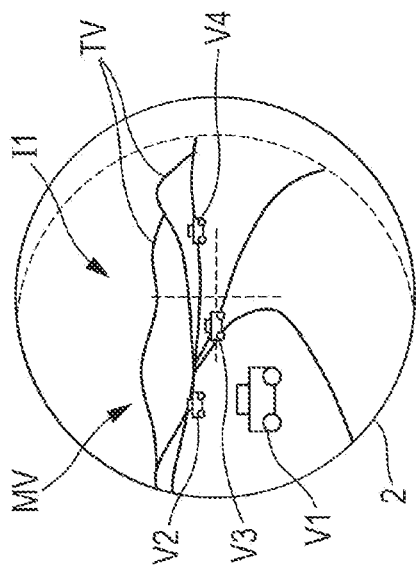
FIGS. 6A to 6F show different representations allowing to explain the implementation of the simulation method when applied to a plurality of real actors.
Figure 6B:
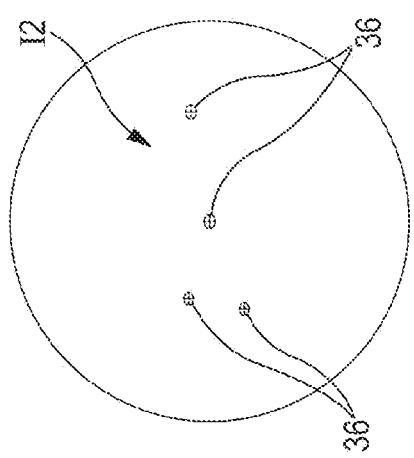

To this end, said method P comprises, as shown in FIG. 3, a sequence of steps E1 to E4 comprising:
  a generation step E1, implemented by the generation unit 7 (FIG. 1), consisting in generating a virtual image I1 (with virtual reality), the virtual image I1 being defined according to an orientation reference and a sighting reference and being generated from at least data of the database 16, of the position of the simulator 1 in the terrain and of the position of the real actor or actors in the terrain, the virtual image I1 generated in this way being displayed on the sight 2 (FIGS. 4C, 5C and 6C);
  a generation step E2, implemented by the generation unit 9 (FIG. 1), consisting in generating a captured image I2. The captured image I2 is generated in the generation step E2 from angle-error and telemetry measurements relating to one or more actors Ri, each of which is equipped with a retro-reflector 10. The angle-error and telemetry measurements are carried out by the simulator 1 using the rangefinder 8 which generates telemetry emissions, which are received and sent back by the retro-reflectors equipping the real actors Ri;
  a comparison step E3, implemented by the comparison unit 11 (FIG. 1), consisting in comparing the current virtual image I1 and the captured image I2 so as to determine at least one error value representative of an orientation and/or sighting error; and
  a resetting step E4, implemented by the comparison unit 13 (FIG. 1), consisting in resetting the orientation reference and/or the sighting reference of the virtual image to correct said error value so as to create an optimised virtual image I1opt, this optimised virtual image I1opt then being displayed on the sight 2 in place of the current virtual image, as represented in FIGS. 4F, 5F and 6F. This optimised virtual image I1opt then becomes the current virtual image.

As mentioned above, the virtual image I1, generated in the generation step E1, is defined according to an orientation reference and a sighting reference, and is generated from at least data of the database 16, of the position of the simulator 1 in the terrain (and thus of the weapon system 4 provided with the simulator 1) and of the position of the various real actors in the terrain TR.

Specifically:
  a sighting reference close to the sighting origin of the weapon system 4 is set. The sighting reference can be defined by locating devices. This can be done using a GPS system, but also by triangulation with respect to known points in the environment. The case where the sighting reference is close to the sighting origin of the weapon system 4 is a special advantageous case. The weapon system 4 has a reference axis passing through the sighting reference; and
  an orientation reference is set. In an advantageous embodiment, the orientation reference may coincide with or be close to the sighting direction of the weapon system 4.

In addition, the simulator 1 has the database 16 (FIG. 1) comprising digital data of the terrain TR (FIG. 2). The database 16 can be made up of numerical quantities allowing the location of the points in the terrain in an absolute reference frame. The database 16 can be supplemented with all the objects relevant to the simulation or to the exercise carried out with the weapon system, in particular the buildings and the man-made objects, as well as the vegetation.

The generation step E1 of the method P comprises at least the following sub-steps:
- a sub-step E1A consisting in determining the position of the simulator 1 in the terrain TR;
- a sub-step E1B consisting in determining the position of the (real) actors Ri in the terrain TR; and
- a sub-step E1C consisting in creating the virtual image I1 by representing the location of the actors in a cone around the orientation reference with a summit placed on the sighting reference of the sight 2.

In sub-step E1A, the simulator 1 has the position of the simulation weapon system 4 in the terrain. For the movable weapon systems, the simulator 1 may have the position refreshed at each position reached, or a real-time refresh for continuously displacing the systems. In addition:
- in a first particular embodiment, the position data results from the periodic readings of sensors, such as the sensor 18, which is for example part of a GPS system; and
- in a second particular embodiment, the position data results from a modelled trajectory. The modelling can be reset from time to time by measured positions.

In addition, for sub-step E1B, the simulator 1 has the position of the actors (or potential targets) in the terrain. The position of the targets can be provided to the simulator 1 of the weapon system 4 by various means depending on the embodiment envisaged. In particular:
- one of the means consists in loading the position data of the potential targets into a database (not shown) of the simulator 1 of the weapon system 4 prior to the exercise;
- another means for the simulator 1 of the weapon system 4 consists in receiving the positioning data of the potential targets by communication means, in particular by the communication system 28, at any time before or during the exercise.

For the potential movable targets, the simulator 1 has the position refreshed at each position reached or a real time refresh for continuously displacing the targets. In addition:
- in a first particular embodiment, the position data is results from the periodic reading of sensors of the potential target, and is transmitted to the simulator 1 (preferably via the communication system 28); and
- in a second particular embodiment, the position data results from a modelled trajectory. The modelling can be reset from time to time by measured positions.

Furthermore, in sub-step E1C, the simulator 1 creates a virtual image I1 of the sighting by representing the location of the potential targets in a cone around the orientation reference with a summit placed on the sighting reference.

In the virtual image, the generation unit 7 represents the location of the potential targets by points representing the orientation of the virtual target with respect to the sighting reference in a graph where the azimuth angle is on the abscissa and the elevation angle is on the ordinate. In cases where a target (or real actor) is not directly visible to the shooter, its representation is rendered in the virtual image displayed on the sight 2 of the weapon system 4.

In a preferred embodiment, the generation unit 7 additionally displays, in the generation step E1, on the virtual image I1 (FIG. 2) an imaged (or infrared) representation TV of at least a part of the terrain TR located in the field of the sight 2, from the database 16 comprising data of the terrain.

Furthermore, in a particular embodiment, the generation step E1 may associate an oriented image resulting from a 3D model of the actor under consideration with the location of each actor constituting a potential target. It may also associate an image of the buildings and/or any useful objects added to the database 16 of the terrain.

In addition, to make the sighting more realistic, it is possible to display an object reproducing the aspect of a generic actor or the aspect of the real actor, as far as it is known, at the location of its localisation in the virtual image I1, as shown in FIG. 2 for the virtual actors V1 to V4. Depending on the information available to the simulator 1, the presented appearance of the virtual actor may take into account the angle from which he or she is viewed from the simulator 1.

The sub-step E1C creates the virtual image I1 (in 3D) by associating the location of each of the potential targets in the virtual image with its distance from the simulator (and thus from the simulating weapon system 4).

Furthermore, the generation step E2 of the method P, intended to generate the captured image I2, comprises, as shown in FIG. 3, at least the following sub-steps E2A to E2D:
- a sub-step E2A consisting in carrying out, with the laser rangefinder 8, telemetry emissions in different directions in a cone around the orientation reference of the sight and carrying out a telemetry measurement in each of the directions where the telemetry emission is sent back towards the rangefinder 8;
- a sub-step E2B consisting in carrying out a measurement of the elevation and azimuth angles of the orientation of each of the directions which have been the subject of a telemetry measurement;
- a sub-step E2C consisting in using the measurements of the elevation and azimuth angles about the orientation reference to create an image of said directions represented by points in a plane where the azimuth angle is on the abscissa and the elevation angle is on the ordinate; and
- a sub-step E2D consisting in creating a 3D image by associating to each of said points the corresponding distance obtained by the telemetry measurement. This 3D image represents the captured image I2 generated.

Typically, as shown in FIG. 1, the rangefinder 8 emits an electromagnetic wave OE representing the telemetry emission, and measures the time taken for the electromagnetic wave OE to return to the rangefinder 8 after reflection, in particular by an actor Ri, representing a potential target for the weapon system 4. The reflection of the wave towards the emitter is advantageously carried out by using the retro-reflectors 10, for example of the cube corner type. The potential targets are, as mentioned above, equipped with retro-reflectors 10.

The rangefinder 8 is adjustable in elevation and azimuth, as represented by angles A and B in FIG. 1. The rangefinder 8 comprises a conventional distance measuring unit 32 for the telemetry measurements and a conventional elevation and azimuth angle measurement unit 33 for the angle-error measurements.

Furthermore, the comparison step E3 of the method P, which follows the generation step E2, carries out the comparison by determining at least the deviation between the position of at least one actor in the virtual image I1 and the position of this same actor in the captured image I2.

The comparison step E3 determines the error value by implementing one method amongst a plurality of different possible methods and using one or more deviations, as specified below based on different examples. In particular, it can be envisaged that:
- the error value (or function) relates only to a selection of points in both images. In particular, it can be planned to ignore the movable points, or to select only the points on infrastructures;
- filters can be used to select the points in the images that enter the error calculation. Some filters can eliminate the points that have no close counterpart in the other image. Other filters can select the points located within a predefined distance range;
- specific criteria can be adopted where only one point (or one selected point) appears in either image; and
- error weights can be implemented, by giving more weight to some points than to others, and in particular by giving more weight to permanently stationary potential targets, such as a building.

The comparison step E3 determines the error value by implementing one of several possible methods and using one or more deviations, as described below in the description of various examples, with reference to FIGS. 4A to 4F, 5A to 5F and 6A to 6F.

Figure 4A:
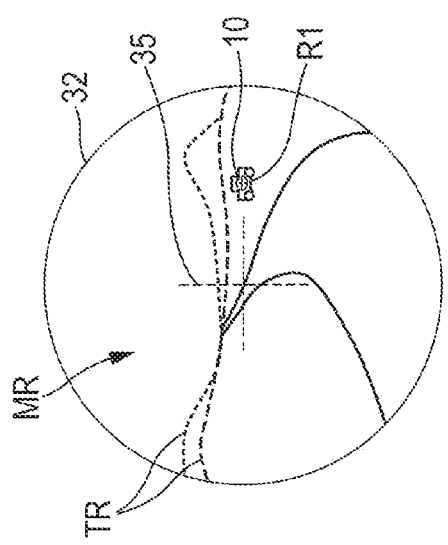
FIGS. 4A to 4F show different representations allowing to explain the implementation of the simulation method when applied to a real actor only.
Figure 4B:
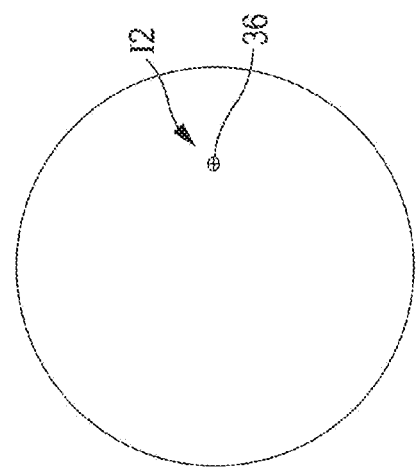
Figure 4C:
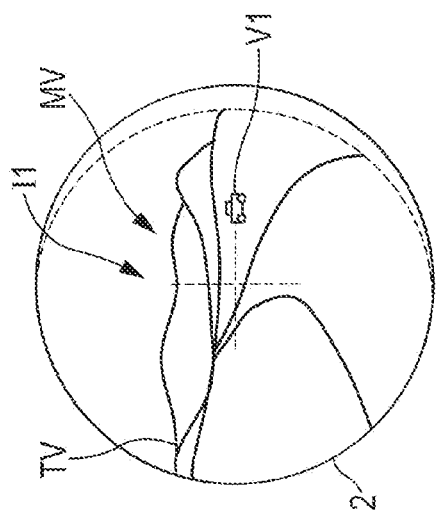
Figure 4D:
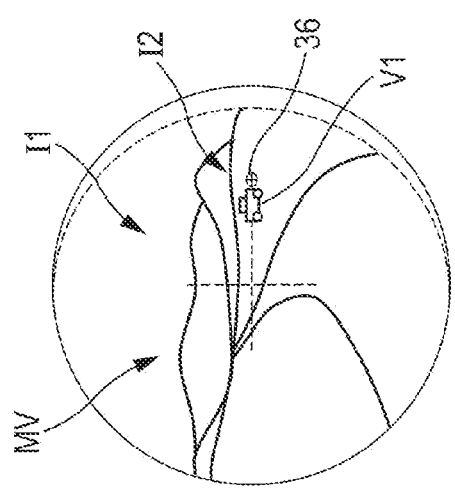
Figure 4E:
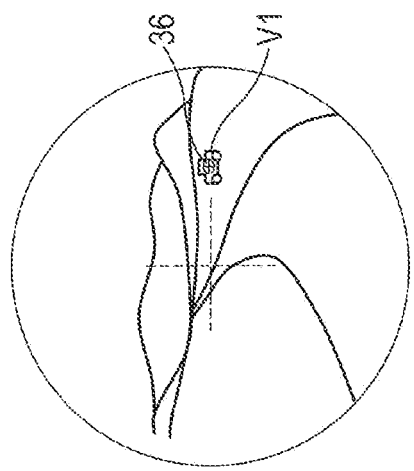
Figure 4F:
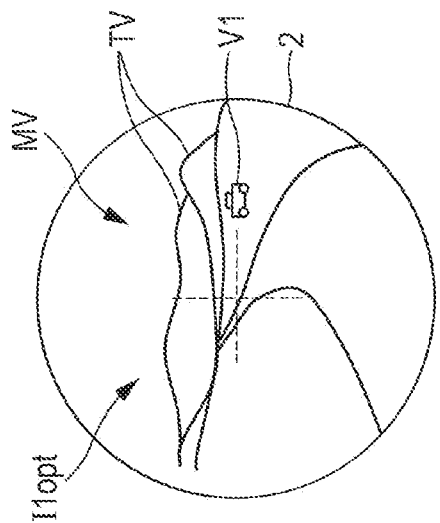

FIGS. 4A to 4F show different representations allowing to clearly explain the implementation of the method P as described above, when applied to only one real actor R1 provided with a retro-reflector 10. In particular:
- FIG. 4A shows a real view (from the real world MR) in a real sight 32 of the weapon system 4. The outer circle represents the limits of the actual sight 32. The cross 35 represents the designator of the target to be engaged;
- FIG. 4B shows the captured image I2 (in 3D). This captured image I2 comprises as its only element a representation 36 of the retro-reflector 10 of the real actor R1. The landscape elements and the targets do not leave a trace in this representation;
- FIG. 4C shows the virtual image I1 (in 3D) in the sight 2 of the simulator 1, which comprises the virtual actor V1 representative of the real actor R1. The dashed curve part represents the circumference of the virtual sight, and the scene is constructed from the database 16 and from the type and the position of the actors provided to the simulator 1, preferably by the central device 26;
- FIG. 4D shows the comparison between the captured image I2 (of FIG. 4B) and the virtual image I1 (of FIG. 4C), implemented in the comparison step E3. The two images I1 and I2 are superimposed in a same representation. It can be seen that there is a deviation between the position of the representation 36 of the retro-reflector 10 of the captured image I2 and the position of the virtual actor V1 on which the representation 36 should be located in the absence of error;
- FIG. 4E shows the result of the resetting of the orientation reference, implemented in the resetting step E4. To do this, the orientation reference of the virtual image I1 is rotated to match the representation 36 of the retro-reflector 10 with its position on the virtual actor V1. During this operation, the landscape data from the database is rotated by a same angular value; and
- FIG. 4F shows the optimised virtual image I1opt, obtained by the implementation of the method P (intended to increase the accuracy), as visible in the sight 2 of the weapon system 4.

In the event that only one stationary actor (or target) is located within the cone of the rangefinder 8, the simulator 1 compares its position from the rangefinder 8 with its position from the location transmitted by the central device 26. If, given the measurement uncertainties, there is a high probability that the target positioned by the rangefinder 8 and the target positioned in the virtual image I1 refer to a same object, the simulator 1 modifies its view by applying an angle correction leading to a new orientation reference and/or an origin correction leading to a new sighting reference in the virtual environment (in the optimised virtual image I1opt displayed on the sight 2) in such a way that there is no longer any deviation between the position obtained from the rangefinder 8 and the corrected position of the target obtained from the localisation transmitted by the central device 26. If necessary, all the objects and the landscape elements are corrected identically in the optimised virtual image I1opt so that the relative distances between them are maintained.

Figure 5A:
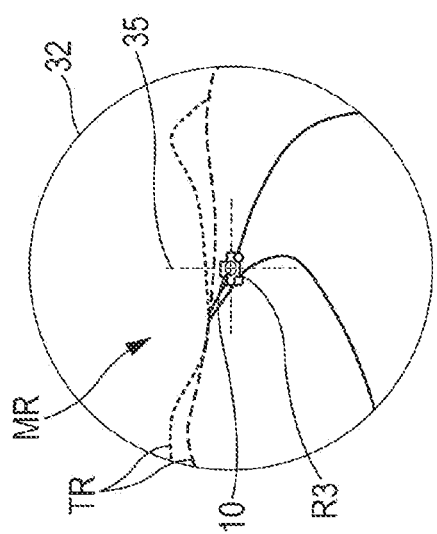
Figure 5D:
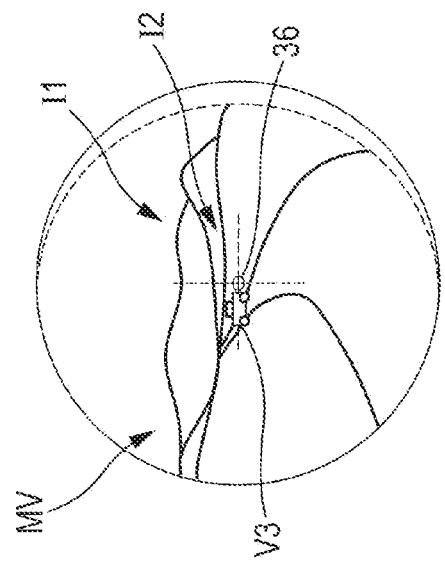

FIGS. 5A to 5F (which show different representations allowing to explain the implementation of the method P when applied to only one real actor R3 provided with a retro-reflector 10) are figures representing situations similar, respectively, to those of FIGS. 4A to 4F. The only difference is that the real actor R3 is the target that is engaged in the simulated shooting. In this particular case, which is frequent in practice, the target (real actor R3) is located in the centre of the sighting, being positioned under the sighting cross 35 (FIG. 5A).

Figure 6A:
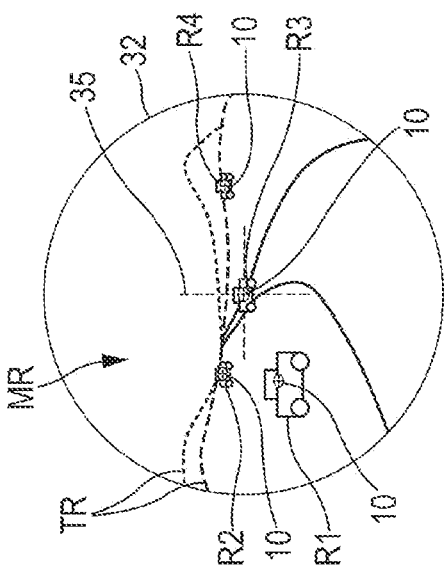
Figure 6F:
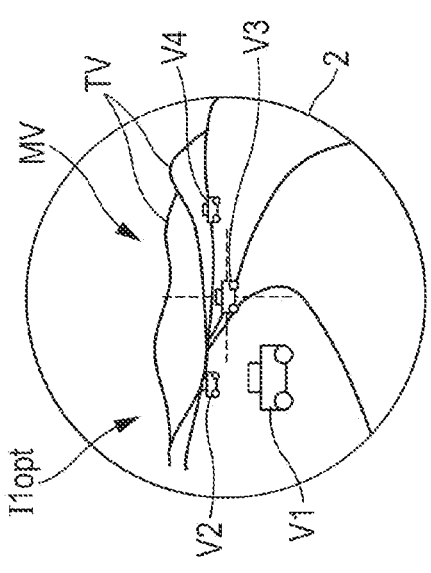
Figure 6E:
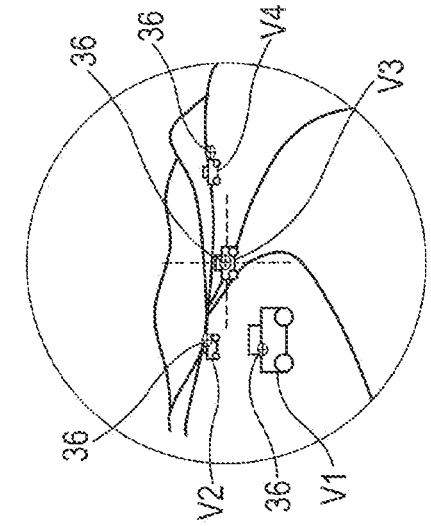
Figure 6D:
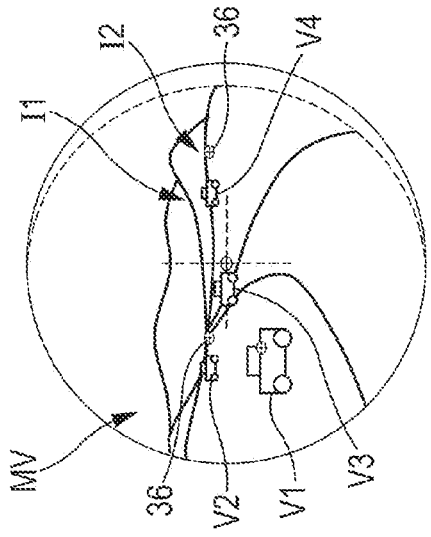

Furthermore, FIGS. 6A to 6F show different representations allowing to explain the implementation of the method P, when it is applied to several real actors R1, R2, R3 and R4 which are each provided with a retro-reflector 10. These FIGS. 6A to 6F represent situations similar to those in FIGS. 4A to 4F respectively. Furthermore, of the real actors R1, R2, R3 and R4, the real actor R3 is a target that is located in the centre of the sighting, being positioned under the sighting cross 35 (FIG. 6A).

In the case where several stationary actors are located in the cone of the rangefinder 8, the simulator 1 carries out a global comparison such that the view constituted by the assembly of the positions of the actors from the rangefinder 8 (captured image I2) and the view constituted by the assembly of the positions of the actors from their localisations transmitted by the central device 26 (virtual image I1) are displaced with respect to each other by an origin and by modifying the orientation reference and the sighting reference so as to bring each position of the captured image I2 closer to the most probable actor among the virtual actors present in the virtual image I1. An error function takes into account the assembly of the residual deviations, two by two, between the positions of the actors in the captured image I2 and their positions in the virtual image I1. Of all the possible joint changes to the orientation reference and the sighting reference, the one that minimises this error function is selected as optimal. The new sighting reference and the new orientation reference resulting from this modification are taken as the new reference for the optimised virtual image I1opt (FIG. 6F). All the actors and, if applicable, all the objects and the landscape elements are placed in this new virtual landmark, in an identical manner, in order to keep the relative distances between them.

If the simulator 1 places more emphasis on one part of the actors, it can choose to restrict the previous analysis to a selected set of actors. It then applies various filters to eliminate from the comparison the retro-reflectors observed in the terrain associated with avatars that are not part of the actors of the selected set of actors. For example, a filtering may consist in excluding the retro-reflectors that are located in distance ranges that do not correspond to any of the actors in the selected actor set. In another example, the filtering eliminates all the retro-reflectors whose angular deviations from each of the selected actors exceed a predetermined angle.

A special case of the restriction of the set of actors consists in limiting to one single actor. In this case, the filtering of the retro-reflectors aims at keeping only one actor and we return to the case described above relating to one single actor.

Furthermore, in the case of moving actors, the measurement of their position is subject to an additional uncertainty due, in particular, to the latency of the measurements, which leads to a time lag resulting from the lack of simultaneity of the measurement and of its provision to the simulator 1, in particular because of the delays in transmitting the information. This situation can be taken into account:

ignoring the movable actors in the overall comparison, if one or more actors are located in the field of the rangefinder 8. The calculation of the correction is carried out without taking into account the movable actors, but their position is corrected in the optimised virtual image I1opt, via the corrections carried out during the resetting; or taking them into account with a lower weight in the error function, in relation to a higher positioning uncertainty for them; or if there are few actors, or if the movable actor is alone in the field of the rangefinder 8, by taking into account successive measurements and refining its localisation estimate in the virtual image by a predictive approach established on the basis of successive position and/or speed measurements, while applying the approach associated with the stationary actors for a single actor or for several actors in the field of the rangefinder 8, depending on the situation.

It should also be noted that:

a frequent particular case consists in making the optical axis coincide with the initial axis of orientation;

another frequent particular case is when the stationary actor or one of the stationary actors is the target to be engaged in simulation shooting. In this case, the optical axis is close to the sighting direction to engage this actor, but not necessarily identical, as a deviation may be caused by taking into account ballistic corrections.

The simulator 1 and/or the method P, as described above, can be used for different types of weapon systems. In particular, they can be used to simulate:

weapons with a sighting system secured to the weapon that allows to engage targets in direct view;
weapons with a sighting system secured to the ammunition that allows engagement of the targets seen by the ammunition at all stages of the flight;
weapons with the two types of sighting mentioned above.

They can also be used to simulate:

barrel-type weapons;
ballistic missile type weapons;
guided missile weapons (wire, fibre optic, radio, laser);
a scope of shooting observer.

Furthermore, the simulator 1 and/or the method P, as described above, can be implemented for different situations. In particular, they can be implemented:

to simulate the engagement of the shooting. In this case, the shooting can be activated coincident with a manipulation step of the simulation weapon, such as holding it, lifting the safety, pressing a trigger or a firing button, etc.
periodically, during all or part of the simulated flight of the munition;
episodically or periodically, during the sighting phases and during all or part of the duration of the observations made with the sight (whether for a pre-shooting sighting or for an observation of a tactical situation).

Furthermore, the simulator 1 can also be used to provide, in a means of observation simulator, a replica of the view of the tactical situation in the virtual world, in which the method P is implemented to simulate the observations captured by a shooting observer.

Furthermore, in a preferred embodiment, the new orientation reference and/or the new sighting reference generated in the resetting step (by the resetting unit 13) are transmitted to the central device 26 (e.g. by the transmission unit 15).

In the context of the present invention, the new orientation reference and/or the new sighting reference can be used for different purposes of a simulation such as the simulation of the observations, the simulation of the engagements and for establishing the sanction of the simulated shooting.

Furthermore, in the context of the present invention, the initial orientation reference and/or sighting reference can be obtained in different ways. In particular:

the initial orientation reference and sighting reference can be determined by sensors (GPS, attitude, north, etc.) equipping the simulator 1, such as the sensor 19, or sensors (GPS, attitude, north, etc.) equipping the weapon system 4;

the initial orientation reference and the sighting reference can be provided by an operator via the human-machine interface 17;

the initial orientation reference and sighting reference can be provided by the central device 26 via the communication system 28 which cooperates with the transmission unit 15 of the simulator 1.

In addition, provision may be made to provide a new initial orientation reference and a new initial sighting reference at any time, for example in the event of a significant reorientation of the weapon system 4.

The invention claimed is:

1. A method for simulating a field of vision of a vision element of a simulator, said vision element displaying a virtual image of a virtual world representative of a real world located in its field of vision, the virtual image comprising one or more virtual actors representative of real actors located in the terrain, said method comprising a series of successive steps comprising a step of generating (E1) the virtual image, the virtual image being defined according to an orientation reference and a sighting reference and being generated from at least data of a terrain database, of the position of the simulator in the terrain and of the position of said real actor or actors in the terrain, the virtual image displayed on the vision element being referred to as current image, characterised in that said sequence of successive steps further comprises:

a step (E2) of generating an image referred to as captured image consisting in generating the captured image from measurements of angle-error and telemetry relating to one or more of said real actors, each of which is equipped with a retro-reflector, the measurements of angle-error and of telemetry being carried out by the simulator with the aid of a rangefinder generating telemetry emissions received and sent back by the retro-reflectors equipping the real actors;

a comparison step (E3) consisting in comparing the current virtual image and the captured image so as to determine at least one error value representative of an orientation and/or sighting error; and a resetting step (E4) consisting in resetting the orientation reference and/or the sighting reference of the virtual image to correct said error value so as to create an optimised virtual image, this optimised virtual image then being displayed on the vision element instead of the current virtual image.

2. The method according to claim 1,
characterised in that the step of generating (E1) the virtual image comprises at least the following sub-steps:
a sub-step (E1A) consisting in determining the position of the simulator in the terrain;
a sub-step (E1B) consisting in determining the position of the actors in the terrain; and
a sub-step (E1C) consisting in creating the virtual image by representing the location of the actors in a cone around the orientation reference with a summit placed on the sighting reference of the vision element.

3. The method according to claim 1,
characterised in that the step of generating (E1) the virtual image additionally displays on the virtual image a representation of at least one part of the terrain located in the field of vision of the vision element, from the terrain database.

4. The method according to claim 1,
characterised in that the step of generating (E2) the captured image comprises at least the following sub-steps:
a sub-step (E2A) consisting in carrying out, with the rangefinder, telemetry emissions in different directions in a cone around the orientation reference of the vision element and carrying out a telemetry measurement in each of the directions where the telemetry emission is sent back to the rangefinder;
a sub-step (E2B) consisting in carrying out a measurement of the elevation and azimuth angles of the orientation of each of the directions which have been the subject of a telemetry measurement;
a sub-step (E2C) consisting in using the measurements of the elevation and azimuth angles about the orientation reference to create an image of said directions represented by points in a plane where the azimuth angle is on the abscissa and the elevation angle is on the ordinate; and
a sub-step (E2D) consisting in creating a 3D image by associating to each of said points the corresponding distance obtained by the corresponding telemetry measurement, this 3D image representing the captured image.

5. The method according to claim 1,
characterised in that the comparison step (E3) carries out the comparison by determining the deviation between the position of at least one actor in the virtual image and the position of this same actor in the captured image, and in that the comparison step determines the error value using the following deviation or deviations:
the deviation relating to a single actor; or
the deviations relating to all the actors; or
the deviations relating to some of the actors who were selected according to at least one particular criterion.

6. The method according to claim 1,
characterised in that said sequence of successive steps can be implemented at least:
periodically; or
when a particular element is handled by an operator.

7. The method according to claim 1,
characterised in that it comprises a further step consisting in transmitting the orientation reference and/or the sighting reference, obtained after the resetting, to at least one user device.

8. A simulator for simulating the field of vision of a vision element, said vision element of the simulator displaying a virtual image of a virtual world representative of a real world located in its field of vision, the virtual image comprising one or more virtual actors representative of real actors located in the terrain,
said simulator also comprising a unit for generating the virtual image, the virtual image being defined according to an orientation reference and a sighting reference and being generated from at least data of a terrain database, of the position of the simulator in the terrain and of the position of said real actor or actors in the terrain, the virtual image displayed in the vision element being referred to as current,
characterised in that it further comprises:
a rangefinder configured to carry out angle-error and telemetry measurements;
a unit for generating an image referred to as captured configured to generate the captured image from measurements of angle-error and telemetry relating to one or more real actors, each of which is equipped with a retro-reflector, the angle-error and telemetry measurements being carried out by the simulator with the aid of the rangefinder generating telemetry emissions which are received and sent back by the retro-reflectors equipping the real actors;
a comparison unit configured to compare the current virtual image and the captured image so as to determine at least one error value representative of an orientation and/or sighting error; and
a resetting unit configured to reset the orientation reference and/or the sighting reference of the virtual image to correct said error value so as to create an optimised virtual image, this optimised virtual image then being displayed on the vision element instead of the current virtual image.

9. The simulator of claim 8,
characterised in that it further comprises at least one of the following elements:
a data emission and reception unit;
the terrain database;
a human-machine interface;
at least one sensor for determining the position of the simulator;
at least one sensor for determining the orientation reference and/or the sighting reference of the vision element.

10. The simulator of claim 8,
characterised in that it corresponds to one of the following simulators:
a combat shooting simulator that simulates real-world shooting by engaging the shooting in a virtual world reconstructed from the position of the actors in the real world;
an observation device simulator.

11. A weapon system,
characterised in that it comprises at least one simulator according to claim 8.

12. The weapon system of claim 11,
characterised in that it is one of the following types:
a weapon provided with a barrel;
a ballistic missile;
a guided missile.

13. The weapon system of claim 12,
characterised in that it comprises a laser device generating a shooting simulation, and in that this laser device is used as a rangefinder by the simulator.

14. A simulation system,
characterised in that it comprises:
- at least one weapon system according to claim 13, provided with at least one simulator;
- retro-reflectors equipping one or more actors;
- means for determining the position of the actor or actors;
- a central device configured to be able to communicate at least with the simulator of said weapon system.

15. The simulation system of claim 14,
characterised in that at least several of said actors equipped with retro-reflectors are each equipped with a weapon system, which is provided with at least one simulator.

* * * * *